United States Patent
Wang et al.

(10) Patent No.: US 11,956,658 B2
(45) Date of Patent: *Apr. 9, 2024

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Shukun Wang, Dongguan (CN); Wenhong Chen, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/983,653

(22) Filed: Nov. 9, 2022

(65) Prior Publication Data

US 2023/0069371 A1  Mar. 2, 2023

Related U.S. Application Data (63) Continuation of application No. 17/394,562, filed on Aug. 5, 2021, now Pat. No. 11,533,644, which is a
(Continued)

(30) Foreign Application Priority Data

Nov. 6, 2019  (WO) ................ PCT/CN2019/116089

(51) Int. Cl.
*H04W 24/08* (2009.01)
*H04L 5/00* (2006.01)
(Continued)

(52) U.S. Cl.
CPC .......... *H04W 24/08* (2013.01); *H04L 5/0048* (2013.01); *H04L 5/0073* (2013.01); *H04L 5/14* (2013.01); *H04W 88/06* (2013.01)

(58) Field of Classification Search
CPC ..... H04W 24/08; H04L 5/0048; H04L 5/0073
See application file for complete search history.

(56) References Cited

U.S. PATENT DOCUMENTS 11,533,644 B2 *  12/2022  Wang .................... H04L 5/0073
2017/0367073 A1   12/2017  Murugan et al.
(Continued)

FOREIGN PATENT DOCUMENTS

CN  109219970 A  1/2019
CN  109391973 A  2/2019
(Continued)

OTHER PUBLICATIONS

International Search Report issued in corresponding International Application No. PCT/CN2019/121364, dated Jul. 28, 2020, 28 pages.
(Continued)

*Primary Examiner* — Kevin C. Harper
(74) *Attorney, Agent, or Firm* — BAYES PLLC (57) ABSTRACT

Embodiments of the present disclosure provide a wireless communication method, terminal device and network device, which may implement CLI measurement. The wireless communication method includes receiving, by a first terminal device, first configuration information sent by a first network device, the first configuration information being configured to configure a sounding reference signal (SRS) resource for cross link interference (CLI) measurement.

20 Claims, 3 Drawing Sheets

Related U.S. Application Data continuation of application No. PCT/CN2019/121364, filed on Nov. 27, 2019.

(51) Int. Cl.
*H04L 5/14* (2006.01)
*H04W 88/06* (2009.01)

(56) References Cited

U.S. PATENT DOCUMENTS

| | | | |
|---|---|---|---|
| 2018/0205427 | A1 | 7/2018 | Ghosh et al. |
| 2018/0323916 | A1 | 11/2018 | Yang et al. |

FOREIGN PATENT DOCUMENTS

| | | | |
|---|---|---|---|
| IN | 109088683 | A | 12/2018 |
| WO | 2018128851 | A2 | 7/2018 |
| WO | 2019032031 | A1 | 2/2019 |
| WO | 2019032779 | A1 | 2/2019 |
| WO | 2019141036 | A1 | 7/2019 |

OTHER PUBLICATIONS

PCT Written Opinion of the International Searching Authority issued in corresponding International Application No. PCT/CN2019/121364, dated Jul. 28, 2020, 7 pages.

"3rd Generation Partnership Project; Technical Specification Group Radio Access Network; NR; User Equipment (UE) radio access capabilities (Release 16)", 3GPP TS 38.306 V16.2.0 (Sep. 2020), 110 pages.

"Details of UE CLI measurements", Agenda item: 8.2.1, Source: Nokia, Nokia Shanghai Bell, 3GPP TSG-RAN WG4 Meeting#90bis, R4-1903828, Xi'an, China, Apr. 8-12, 2019, 6 pages.

"3rd Generation Partnership Project; Technical Specification Group Radio Access Network; NR; Radio Resource Control (RRC) protocol specification (Release 16)", 3GPP TS 38.331 V16.2.0 (Sep. 2020), 916 pages.

"Offline Discussion Summary#1 of CLI topics", Agenda Item: 7.2.5.1, Source: LG Electronics, 3GPP TSG RAN WG1 Meeting #96, R1-1903453, Athens, Greece, Feb. 12-16, 2019, 29 pages.

Extended European Search Report issued in corresponding European Application No. 19951668.3, dated Mar. 2, 2022, 8 pages.

"UE CLI measurement configuration and reporting", Agenda item: 11.15, Source: Nokia, Nokia Shanghai Bell, 3GPP TSG-RAN2#107, R2-1909023, Prague, Czech Republic, Aug. 26-30, 2019, 10 pages.

"UE CLI measurement configuration, reporting, and NW signaling", Agenda item: 6.15, Source: Nokia, Nokia Shanghai Bell, 3GPP TSG-RAN2#107bis, R2-1912408, Chongqing, China, Oct. 14-18, 2019, 10 pages.

First Office Action issued in corresponding Indian application No. 202127046564, dated Jun. 10, 2022.

Priority Review of Patent Application issued in corresponding Chinese application No. 202110926577.5, dated Aug. 26, 2022.

First Office Action issued in corresponding Chinese application No. 202110926577.5, dated Sep. 27, 2022.

ZTE Corporation et al., "Remaining issues on CLI measurement", R2-1912775, 3GPP TSG-RAN WG2 Meeting #107bis Chongqing, China, Oct. 14-18, 2019.

LGE, "draft CR on CLI for 38.331", R2-1914012, 3GPP TSG-RAN2 Meeting #107bis Chongqing, China, Oct. 14 -18, 2019.

Ran1, "LS on UE-UE CLI measurement/reporting and Network coordination mechanism for CLI", R1-1903677, 3GPP TSG RAN WG1 Meeting #96 Athens, Greece, Feb. 25-Mar. 1, 2019.

Extended European Search Report issued in corresponding European application No. 23163198.7, dated Jun. 20, 2023.

\* cited by examiner

WIRELESS COMMUNICATION METHOD, TERMINAL DEVICE, AND NETWORK DEVICE

CROSS-REFERENCE TO RELATED APPLICATIONS

The present application is a continuation application of U.S. application Ser. No. 17/394,562, which is a continuation of International Application No. PCT/CN2019/121364, filed on Nov. 27, 2019, which claims the benefit of priority to International Application No. PCT/CN2019/116089, filed on Nov. 6, 2019, all of which are incorporated herein by reference in their entireties.

BACKGROUND

Embodiments of the present disclosure relate to the field of communication, and more particularly, to a wireless communication method, terminal device and network device.

In a time division duplex (TDD) mode, uplink transmission of one terminal device may interfere with downlink reception of another terminal device, thereby causing cross link interference (CLI). How to perform CLI measurement is an urgent problem to be solved.

SUMMARY

Embodiments of the present disclosure provide a wireless communication method, terminal device, and network device.

A first aspect provides a wireless communication method, and the method includes receiving, by a first terminal device, first configuration information sent by a first network device, the first configuration information being configured to configure a sounding reference signal (SRS) resource for cross link interference (CLI) measurement, and timing of the SRS referring to timing of a first cell or referring to timing configured by the first network device, wherein the first cell is one of a serving cell with a frequency point associated with the SRS, a primary cell serving the first terminal device, and a primary secondary cell serving the first terminal device.

A second aspect provides a wireless communication method, and the method includes sending, by a first network device, first configuration information to a first terminal device, the first configuration information being configured to configure a SRS resource for CLI measurement, and timing of the SRS referring to timing of a first cell or referring to timing configured by the first network device, wherein the first cell is one of a serving cell with a frequency point associated with the SRS, a primary cell serving the first terminal device, and a primary secondary cell serving the first terminal device.

A third aspect provides a wireless communication method, and the method includes sending, by a second network device, second configuration information to a first network device, the second configuration information being configured to configure a SRS resource for CLI measurement, wherein downlink reception of a first terminal device is interfered by uplink transmission of a second terminal device, the first network device serves the first terminal device, and the second network device serves the second terminal device.

A fourth aspect provides a terminal device configured to execute the method in the above first aspect or each implementation thereof.

Specifically, the terminal device includes a functional module configured to execute the method in the above first aspect or each implementation thereof.

A fifth aspect provides a network device configured to execute the method in the above second aspect or each implementation thereof.

Specifically, the network device includes a functional module configured to execute the method in the above second aspect or each implementation thereof.

A sixth aspect provides a network device configured to execute the method in the above third aspect or each implementation thereof.

Specifically, the network device includes a functional module configured to execute the method in the above third aspect or each implementation thereof.

A seventh aspect provides a terminal device including a processor and a memory. The memory is configured to store a computer program, and the processor is configured to call and run the computer program stored in the memory to execute the method in the above first aspect or each implementation thereof.

An eighth aspect provides a network device including a processor and a memory. The memory is configured to store a computer program, and the processor is configured to call and run the computer program stored in the memory to execute the method in the above second aspect or each implementation thereof.

A ninth aspect provides a network device including a processor and a memory. The memory is configured to store a computer program, and the processor is configured to call and run the computer program stored in the memory to execute the method in the above third aspect or each implementation thereof.

A tenth aspect provides an apparatus configured to implement the method in any one of the above first to third aspects or each implementation thereof.

Specifically, the apparatus includes a processor, configured to call and run a computer program from a memory, so that a device installed with the apparatus executes the method in any one of the above first to third aspects or each implementation thereof.

An eleventh aspect provides a computer-readable storage medium, configured to store a computer program that enables a computer to execute the method in any one of the above first to third aspects or each implementation thereof.

A twelfth aspect provides a computer program product, including computer program instructions that enable a computer to execute the method in any one of the above first to third aspects or each implementation thereof.

A thirteenth aspect provides a computer program that, when running on a computer, causes the computer to execute the method in any one of the above first to third aspects or each implementation thereof.

DETAILED DESCRIPTION

The technical solutions in the embodiments of the present disclosure will be described below in conjunction with the drawings in the embodiments of the present disclosure. Obviously, the described embodiments are a part but not all of the embodiments of the present disclosure. Based on the embodiments in the present disclosure, all other embodiments obtained by those of ordinary skill in the art without creative work shall fall within the protection scope of the present disclosure.

The embodiments of the present disclosure may be applied to various communication systems, such as global system of mobile communication (GSM) system, code division multiple access (CDMA) system, wideband code division multiple access (WCDMA) system, general packet radio service (GPRS), long term evolution (LTE) system, advanced long term evolution (LTE-A) system, new radio (NR) system, NR system evolution system, LTE-based access to unlicensed spectrum (LTE-U) system, NR-based access to unlicensed spectrum (NR-U) system, universal mobile telecommunication system (UMTS), wireless local area network (WLAN), wireless fidelity (WiFi), next-generation communication system or other communication systems, and the like.

Generally, a traditional communication system supports a limited number of connections and is easy to be implemented. However, with the development of communication technology, a mobile communication system not only supports traditional communication, but also supports, for example, device to device (D2D) communication, machine to machine (M2M) communication, machine type communication (MTC), vehicle to vehicle (V2V) communication and the like. The embodiments of the present disclosure may also be applied to these communication systems.

Optionally, the communication system in the embodiments of the present disclosure may be applied to a carrier aggregation (CA) scenario, may also be applied to a dual connectivity (DC) scenario, and may further be applied to a standalone (SA) network deployment scenario.

The applied frequency spectrum is not limited in the embodiments of the present disclosure. For example, the embodiments of the present disclosure may be applied to a licensed spectrum or an unlicensed spectrum.

Figure 1:
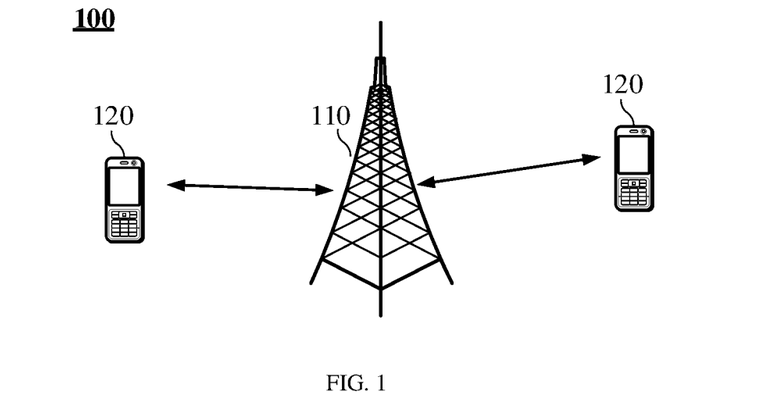
FIG. 1 is a schematic diagram of a communication system architecture according to an embodiment of the present disclosure.

Exemplarily, a communication system 100 applied in an embodiment of the present disclosure is shown in FIG. 1. The communication system 100 may include a network device 110. The network device 110 may be a device that communicates with a terminal device. The network device 110 may provide communication coverage for a specific geographic area, and may communicate with the terminal device located in the coverage area.

FIG. 1 exemplarily shows one network device and two terminal devices. Optionally, the communication system 100 may include a plurality of network devices, and the coverage of each network device may include other numbers of terminal devices, which is not limited in the embodiment of the present disclosure.

Optionally, the communication system 100 may further include other network entities such as a network controller and a mobility management entity, which is not limited in the embodiment of the present disclosure.

It shall be understood that a device with a communication function in the network/system in the embodiments of the present disclosure may be referred to as a communication device. By taking the communication system 100 shown in FIG. 1 as an example, the communication device may include the network device 110 and the terminal device 120 with the communication function. The network device 110 and the terminal device 120 may specifically be the devices described above, which will not be repeated herein. The communication device may also include other devices in the communication system 100, such as a network controller, a mobility management entity, and the like, which is not limited in the embodiments of the present disclosure.

It shall be understood that the terms "system" and "network" are often used interchangeably herein. The term "and/or" herein is merely an association relationship describing associated objects, indicating that there may be three relationships. For example, A and/or B may indicate that A exists alone, both A and B exist, and B exists alone. In addition, the character "I" herein generally indicates that associated objects before and after the same are in an "or" relationship.

In the embodiments of the present disclosure, various embodiments are described in conjunction with the terminal device and network device. The terminal device may also be referred to as user equipment (UE), access terminal, user unit, user station, mobile radio station, mobile station, remote station, remote terminal, mobile device, user terminal, terminal, wireless communication device, user agent, user device or the like. The terminal device may be a station (ST) in WLAN, cell phone, cordless phone, session initiation protocol (SIP) phone, wireless local loop (WLL) station, personal digital assistant (PDA) device, handheld device with wireless communication function, computing device or other processing devices connected to wireless modem, in-vehicle device, wearable device, and terminal device in next-generation communication system such as NR network or future public land mobile network (PLMN) network.

As an example but not a limitation, in the embodiments of the present disclosure, the terminal device may also be a wearable device. The wearable device may also be called a wearable smart device. It is an umbrella term of a device that can be worn and is developed by intelligently designing daily wear with the application of wearable technology, such as glasses, gloves, watches, clothing and shoes. The wearable device is a portable device that is directly worn on the body or integrated into user's clothes or accessories. The wearable device is not only a kind of hardware device, but also realize powerful functions through software support, data interaction, and cloud interaction. In a broad sense, the wearable smart device may be full-featured and large-sized and may achieve complete or partial functions without relying on a smart phone, such as smart watches or smart glasses; or only focus on a certain type of application function, and needs to cooperate with other devices such as smart phones, such as smart bracelets and smart jewelry for physical sign monitoring.

The network device may be a device for communicating with a mobile device. The network device may be an access point (AP) in WLAN, a base transceiver station (BTS) in GSM or CDMA, a NodeB (NB) in WCDMA, an evolutional Node B (eNB, or eNodeB) in LTE, a relay station or access point, a vehicle-mounted device, a wearable device, a network device or base station (gNB) in NR network, or a network device in future evolved PLMN network.

In the embodiments of the present disclosure, the network device provides service for a cell, and the terminal device communicates with the network device through transmission resources (for example, frequency domain resources, or spectrum resources) used by the cell. The cell may be a cell corresponding to a network device (for example, a base station). The cell may belong to a macro base station or a base station corresponding to a small cell. The small cell here may include metro cell, micro cell, pico cell, femto cell and the like. These small cells have the characteristics of small coverage and low transmitting power, and are suitable for providing services with high data transmission rate.

In TDD mode, a configuration ratio of uplink (UL) and downlink (DL) may be static or dynamic. It is assumed that terminals 1 and 2 are located at the edge between cell 1 and cell 2, the terminal 1 is located in the cell 1, and the terminal 2 is located in the cell 2. Uplink transmission of the terminal 1 may correspond to downlink reception of the terminal 2, which causes the uplink transmission of the terminal 1 to interfere with the downlink reception of the terminal 2, and thus generates cross link interference (CLI).

In Release (Rel) 15, NR supports a dynamic DL/UL allocation. However, cross link interference mitigation technology and coexistence requirement are not specified, so the use of dynamic DL/UL allocation operation is greatly restricted.

The duplex flexibility with anti-cross link interference capability has better user throughput than static UL/DL operation or dynamic UL/DL operation without anti-interference ability. The duplex method with anti-cross link interference capability includes coordinated scheduling, beamforming, power control, link adaptation, hybrid dynamic/static UL/DL resource allocation and the like.

R16 mainly agrees to introduce terminal-to-terminal (UE-to-UE) measurement for the CLI, which is mainly that one terminal measures the SRS signal of another terminal to detect interference, but how to exchange SRS measurement configurations between network nodes and which measurement configurations are exchanged need to be clarified. Further, the timing of SRS configuration information and the CLI measurement configuration negotiation in the multi radio access technology dual connectivity (MR-DC) scenario also need to be clarified.

Based on the above technical problems, the present disclosure proposes a CLI measurement solution to make the CLI measurement effective in real time.

The following is a detailed description of the CLI measurement solution designed by the present disclosure with regard to the above technical problems.

Figure 2:
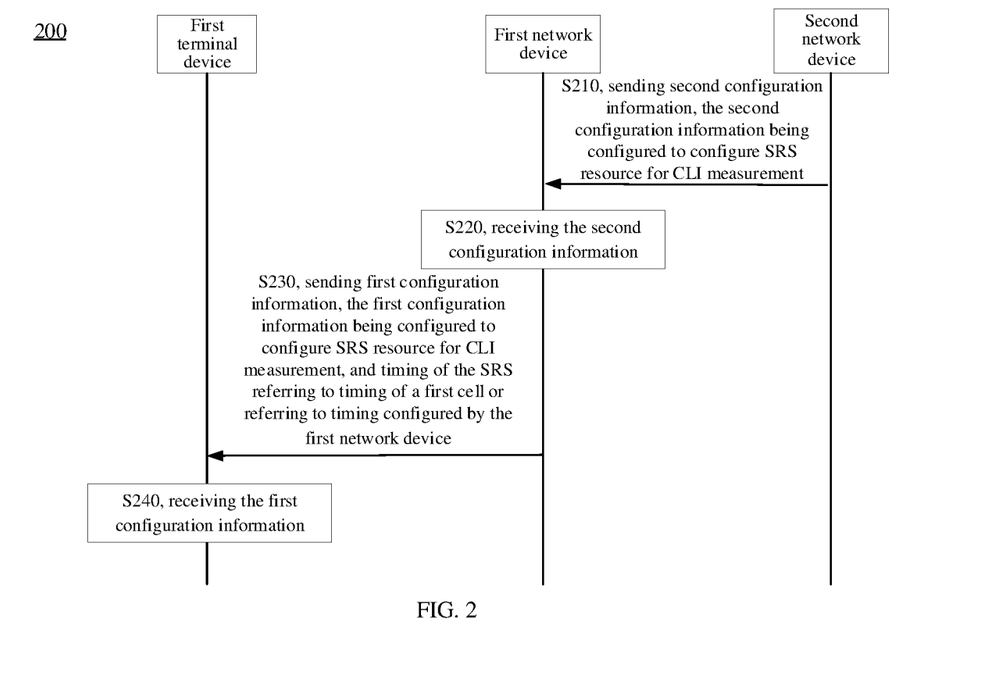
FIG. 2 is a schematic flowchart of a wireless communication method according to an embodiment of the present disclosure.

FIG. 2 is a schematic flowchart of a wireless communication method 200 according to an embodiment of the present disclosure. As shown in FIG. 2, the method 200 may include some or all of the following contents.

At S210, a second network device sends second configuration information to a first network device, the second configuration information being configured to configure an SRS resource for CLI measurement.

At S220, the first network device receives the second configuration information sent by the second network device.

At S230, the first network device sends first configuration information to a first terminal device, the first configuration information being configured to configure the SRS resource for the CLI measurement, and timing of the SRS referring to timing of a first cell or referring to timing configured by the first network device;

At S240, the first terminal device receives the first configuration information sent by the first network device.

It shall be noted that the first network device serves the first terminal device, and the second network device serves a second terminal device.

In an embodiment of the present disclosure, downlink reception of the first terminal device is interfered by uplink transmission of the second terminal device. Specifically, the uplink transmission of the second terminal device corresponds to the downlink reception of the first terminal device, which causes the uplink transmission of the second terminal device to interfere with the downlink reception of the first terminal device, and thus generates cross link interference (CLI).

It shall be noted that, in an embodiment of the present disclosure, the first network device may determine the first configuration information based on the second configuration information, and the first network device may also directly configure the first configuration information. That is, the first network device may perform step S230 in the case where the foregoing step S220 is performed, and the first network device may also directly perform step S230 without performing the foregoing step S220. In other words, the above steps S210 and S220 are not mandatory steps.

Optionally, the first cell is one of a serving cell with a frequency point associated with the SRS, a primary cell serving the first terminal device, and a primary secondary cell serving the first terminal device.

Optionally, the timing configured by the first network device is a synchronization signal block (SSB) configured by a network side.

It shall be noted that generally, the SRS has parameters such as period, offset, and duration. The timing may be determined by the system frame number (SFN) of the SRS. For example, SFN mod period=offset, mod is a modulo operation, then the SFN at this time is the SFN carried by the master information block (MIB) from the SSB.

The SSB may also be referred to as a synchronization signal/physical broadcast channel block (SS/PBCH block).

Optionally, in an embodiment of the present disclosure, the first terminal device measures the SRS measured for the CLI according to the first configuration information.

Optionally, in an embodiment of the present disclosure, the first configuration information includes timing offset information, and the first terminal device may adjust the timing of the SRS according to the timing offset information.

That is, the timing offset information may be configured to adjust the timing of the SRS.

In an embodiment of the present disclosure, the first terminal device may determine the timing of the SRS based on the timing of the first cell, and the first terminal device implements the CLI measurement by measuring the SRS, thereby ensuring that the CLI measurement is effective in real time. Further, the first terminal device may adjust the timing of the SRS according to the timing offset information, thereby further ensuring that the CLI measurement is effective in real time.

Optionally, in an embodiment of the present disclosure, the first configuration information is associated with at least one of frequency information, bandwidth part (BWP) configuration information, cell identification information, and SRS index information.

It shall be noted that the first configuration information is associated with frequency information, BWP configuration information, cell identification information, SRS index information and the like, which may facilitate the CLI measurement and improve the accuracy of the CLI measurement.

Optionally, the first configuration information is associated with at least one of frequency information, BWP configuration information, cell identification information, SRS index information, and uplink configuration information.

Optionally, in an embodiment of the present disclosure, when the first network device determines that the first configuration information needs to be updated, the first network device may trigger the update operation of the first configuration information.

Optionally, the first terminal device receives first indication information for the first configuration information sent by the first network device; and the first terminal device updates part or all of content of the first configuration information according to the first indication information.

That is, the first indication information is configured to indicate the first terminal device to update part or all of the content of the first configuration information.

Further, the first indication information is specifically configured to indicate the first terminal device to modify or delete part or all of the content of the first configuration information, or to increase the content of the first configuration information.

Specifically, the first terminal device, according to the first indication information, modifies or deletes part or all of the content of the first configuration information, or increases the content of the first configuration information.

In an embodiment of the present disclosure, the first terminal device may report capability information thereof to assist the first network device to configure or determine the first configuration information.

Optionally, the first terminal device sends first information to the first network device, and the first information includes at least one of a maximum number of CLI measurement reports supported by the first terminal device, a maximum number of CLI measurement objects supported by the first terminal device, and a maximum number of SRS measurements supported by the first terminal device.

Further, the first network device determines the first configuration information according to the first information.

Optionally, in an embodiment of the present disclosure, a number of CLI measurement reports configured in the first configuration information is less than or equal to a maximum number of CLI measurement reports supported by the first terminal device, and/or a number of CLI measurement objects configured in the first configuration information is less than or equal to a maximum number of CLI measurement objects supported by the first terminal device, and/or a number of SRS measurements configured in the first configuration information is less than or equal to a maximum number of SRS measurements supported by the first terminal device.

In an embodiment of the present disclosure, at least one of the maximum number of the CLI measurement reports, the maximum number of the CLI measurement objects, and the maximum number of the SRS measurements is based on each terminal device, each cell, or each frequency.

In other words, if the maximum number of the CLI measurement reports is based on each terminal device, each terminal device has a specific maximum number of the CLI measurement reports; similarly, if the maximum number of the CLI measurement reports is based on each cell, each cell has a specific maximum number of the CLI measurement reports; and similarly, if the maximum number of the CLI measurement reports is based on each frequency, each frequency has a specific maximum number of the CLI measurement reports. The above is also applied to the maximum number of the CLI measurement objects and the maximum number of the SRS measurements.

Optionally, in an embodiment of the present disclosure, the first terminal device receives third configuration information sent by the first network device, and the third configuration information includes at least one of frequency information, BWP configuration information, cell identification information, SRS index information, and uplink configuration information.

Further, in an embodiment of the present disclosure, the first terminal device sends, in response to the third configuration information, first request information to the first network device, and the first request information is configured to request configuration information for the CLI measurement.

Optionally, in an embodiment of the present disclosure, if the first terminal device detects downlink interference, it requests CLI measurement configuration from the first network device, so as to perform the CLI measurement or identify an interference source.

Optionally, if the first terminal device detects downlink interference, the first terminal device sends first request information to the first network device, the first request information being configured to request configuration information for the CLI measurement.

Correspondingly, the first network device receives the first request information sent by the first terminal device, the first request information being configured to request the configuration information for the CLI measurement; and the first network device sends, in response to the first request information, the first configuration information to the first terminal device.

Optionally, in an embodiment of the present disclosure, the method 200 is applied to an MR-DC scenario.

It shall be noted that the MR-DC may include (LTE NR DC, EN-DC), (NR eLTE DC, NE-DC), (5GC eLTE NR DC, 5GC-EN-DC), NR DC. The EN-DC takes a long term evolution (LTE) node as a master node (MN) node and a NR node as a slave node (SN) node to connect to the evolved packet core (EPC) core network. The NE-DC takes NR as an MN node and evolved long term evolution (eLTE) as an SN node to connect to the 5-generation core (5GC). The 5GC-EN-DC takes eLTE as a MN node and NR as a SN node to connect to the 5GC. The NR DC takes NR as a MN node and NR as a SN node to connect to the 5GC.

Optionally, the first network device is an MN device or an SN device in the MR-DC scenario.

For example, in the (NG) EN-DC or NR-DC, the MN device obtains the first configuration information through an X2 interface or an Xn interface, and sends the first configuration information to the SN device, and then sends, through the SN, the first configuration information to the first terminal device for the CLI measurement.

For another example, in the (NG) EN-DC or NR-DC, the MN device obtains the first configuration information through the X2 interface or the Xn interface, and the MN device directly configures the first configuration information to the first terminal device for the CLI measurement.

For further another example, in the NE-DC, the MN device obtains the first configuration information through the Xn interface, and sends the first configuration information to the first terminal device for the CLI measurement.

Optionally, in the MR-DC scenario, the MN device and the SN device negotiate with each other to determine the first configuration information, or the MN device sends the first configuration information to the SN device.

It shall be noted that the MN device and the SN device negotiate with each other to determine the first configuration information, that is, both the MN device and the SN device participate in the determination of the first configuration information. The MN device sends the first configuration information to the SN device, that is, only the MN device participates in the determination of the first configuration information.

In the NR-DC scenario, the MN device and the SN device negotiate with each other to configure the restriction of the CLI measurement. The MN device notifies the SN device of the restriction parameter of the CLI measurement configuration, and the SN device configures the first configuration information under the restriction. The restriction parameter may be: the maximum number of the CLI measurement reports, and/or the number of the CLI measurement objects, and/or, the number of the SRS measurements.

Optionally, in an embodiment of the present disclosure, after step S220 described above, the first network device determines the first configuration information according to the second configuration information.

Optionally, the second configuration information may also be associated with at least one of frequency information, BWP configuration information, cell identification information, and SRS index information.

Optionally, the second configuration information may also be associated with at least one of frequency information, BWP configuration information, cell identification information, SRS index information, and uplink configuration information.

Optionally, in an embodiment of the present disclosure, the uplink configuration information is frequency point information of the second network device, or the uplink configuration information is configuration information of an absolute frequency point corresponding to the second network device. The uplink configuration information is configured to indicate a frequency point position of a lower boundary of a common resource block (RB) 0.

In an embodiment of the present disclosure, the second network device may actively send the second configuration information, or may send the second configuration information based on the request of the first network device.

Optionally, the first network device sends first information to the second network device, the first information being configured to request the second network device to configure the SRS resource for the CLI measurement.

The first information includes at least one of frequency point information of a serving cell where the first terminal device is located, and bandwidth and frequency point information of dedicated BWP to the first terminal device.

Optionally, the first information is received or obtained by the first network device from a third network device, wherein the first network device is an MN device in an MR-DC scenario, and the third network device is an SN device in the MR-DC scenario.

In other words, first, the third network device sends the first information to the first network device, and then the first network device sends the first information to the second network device. Or, first, the first network device obtains or receives the first information from the third network device, and then the first network device sends the first information to the second network device.

Specifically, if the first information includes the bandwidth and frequency point information of the dedicated BWP to the first terminal device, the SRS resource configured by the second configuration information does not include resource that does not overlap with the dedicated BWP; or if the SRS resource configured by the second configuration information includes the resource that does not overlap with the dedicated BWP, the SRS resource configured by the first configuration information ignores the resource that does not overlap with the dedicated BWP.

In an embodiment of the present disclosure, the second network device may update the second configuration information.

Optionally, the first network device receives second indication information for the second configuration information sent by the second network device; and the first network device updates part or all of content of the second configuration information according to the second indication information.

Specifically, the first network device, according to the second indication information, modifies or deletes part or all of the content of the second configuration information, or increases the content of the second configuration information.

Optionally, information between the first network device and the second network device is a terminal device-oriented Xn interface message, or the information between the first network device and the second network device is a non-terminal device-oriented Xn interface message.

It shall be noted that information between the first network device and the second network device is the terminal device-oriented Xn interface message, which may be understood as that the information between the first network device and the second network device is the Xn interface messages based on each terminal device (per UE). The information between the first network device and the second network device is the non-terminal device-oriented Xn interface message, which may be understood as that the information between the first network device and the second network is a common Xn interface message.

Optionally, in a case where the second network device determines that the second configuration information needs to be updated, the second network device sends the second indication information for the second configuration information.

Optionally, the second network device may determine that the second configuration information needs to be updated based on the request of the first network device.

For example, if the second network device receives request information sent by the first network device for requesting to update the second configuration information, the second network device determines that the second configuration information needs to be updated.

Optionally, the second network device may determine that the second configuration information needs to be updated based on the control of a timer.

For example, when a first timer expires, the second network device determines that the second configuration information needs to be updated.

Specifically, the second network device starts the first timer after sending the second configuration information.

Therefore, in the embodiment of the present disclosure, the first network device configures the SRS resource for the CLI measurement for the first terminal device, and the timing of the SRS refers to the timing of the first cell, thereby ensuring the real-time effectiveness of the CLI measurement.

Further, the second network device configures the SRS resource for the CLI measurement, and the first network device configures, for the first terminal device, the SRS resource for the CLI measurement based on the SRS resource configured by the second network device. The second network device serves the second terminal device that causes interference. Therefore, the reliability of the SRS resource for the CLI measurement configured by the first network device is ensured, and thus the accuracy of the CLI measurement is improved.

Figure 3:
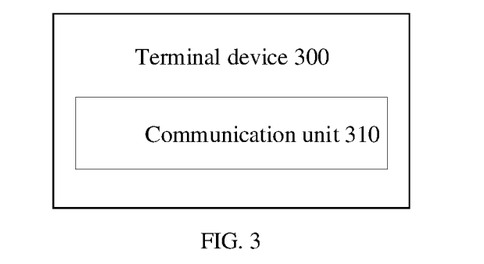
FIG. 3 is a schematic block diagram of a terminal device according to an embodiment of the present disclosure.

FIG. 3 shows a schematic block diagram of a terminal device 300 according to an embodiment of the present disclosure. The terminal device 300 is a first terminal device. As shown in FIG. 3, the terminal device 300 includes a communication unit 310, configured to receive first configuration information sent by a first network device, the first configuration information being configured to configure an SRS resource for CLI measurement, and timing of the SRS referring to timing of a first cell or referring to timing configured by the first network device, wherein the first cell is one of a serving cell with a frequency point associated with the SRS, a primary cell serving the first terminal device, and a primary secondary cell serving the first terminal device.

Optionally, the timing configured by the first network device is an SSB configured by a network side.

Optionally, the first configuration information includes timing offset information, and the terminal device 300 further includes a processing unit 320, configured to adjust the timing of the SRS according to the timing offset information.

Optionally, the first configuration information is associated with at least one of frequency information, BWP configuration information, cell identification information, and SRS index information.

Optionally, the first configuration information is associated with at least one of frequency information, BWP configuration information, cell identification information, SRS index information, and uplink configuration information.

Optionally, the terminal device 300 further includes a processing unit 320, the communication unit 310 is further configured to receive first indication information for the first configuration information sent by the first network device; and the processing unit 320 is configured to update part or all of content of the first configuration information according to the first indication information.

Optionally, the processing unit 320 is specifically configured to modify or delete part or all of the content of the first configuration information according to the first indication information, or increase the content of the first configuration information according to the first indication information.

Optionally, the first communication unit 310 is further configured to send first information to the first network device, the first information including at least one of a maximum number of CLI measurement reports supported by the first terminal device, a maximum number of CLI measurement objects supported by the first terminal device, and a maximum number of SRS measurements supported by the first terminal device.

Optionally, a number of CLI measurement reports configured in the first configuration information is less than or equal to a maximum number of CLI measurement reports supported by the first terminal device, and/or a number of CLI measurement objects configured in the first configuration information is less than or equal to a maximum number of CLI measurement objects supported by the first terminal device, and/or a number of SRS measurements configured in the first configuration information is less than or equal to a maximum number of SRS measurements supported by the first terminal device.

Optionally, at least one of the maximum number of the CLI measurement reports, the maximum number of the CLI measurement objects, and the maximum number of the SRS measurements supported by the first terminal device is pre-configured, or is determined based on capability of the first terminal device.

Optionally, at least one of the maximum number of the CLI measurement reports, the maximum number of the CLI measurement objects, and the maximum number of the SRS measurements is based on each terminal device, each cell, or each frequency.

Optionally, the communication unit 310 is further configured to send first request information to the first network device if the first terminal device detects downlink interference, the first request information being configured to request configuration information for the CLI measurement.

Optionally, the communication unit 310 is further configured to receive third configuration information sent by the first network device, the third configuration information including at least one of frequency information, BWP configuration information, cell identification information, SRS index information, and uplink configuration information.

Optionally, the communication unit 310 is further configured to send first request information to the first network device in response to the third configuration information, the first request information being configured to request configuration information for the CLI measurement.

Optionally, the terminal device 300 further includes a processing unit 320, the processing unit 320 is configured to measure the SRS for the CLI measurement according to the first configuration information.

Optionally, the terminal device 300 is applied to an MR-DC scenario.

Optionally, the first network device is an MN device or an SN device in the MR-DC scenario.

Optionally, an MN device and an SN device in the MR-DC scenario negotiate with each other to determine the first configuration information.

Optionally, downlink reception of the first terminal device is interfered by uplink transmission of a second terminal device.

Optionally, the uplink configuration information is frequency point information of a second network device, or the uplink configuration information is configuration information of an absolute frequency point corresponding to the second network device, wherein the uplink configuration information is configured to indicate a frequency point position of a lower boundary of a common RB 0, and the second network device serves the second terminal device.

It shall be understood that the terminal device 300 according to the embodiment of the present disclosure may correspond to the terminal device in the method embodiment of the present disclosure, and the above and other operations and/or functions of respective units in the terminal device 300 are to respectively implement corresponding processes of the first terminal device in the method 200 shown in FIG. 2, and for the sake of brevity, details thereof are not repeated.

Figure 4:
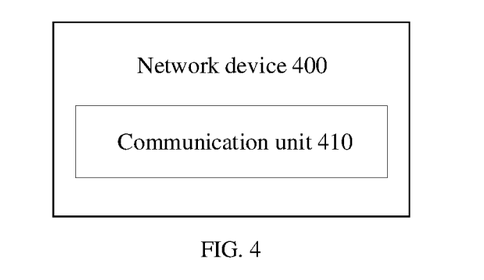
FIG. 4 is a schematic block diagram of a network device according to an embodiment of the present disclosure.

FIG. 4 shows a schematic block diagram of a network device 400 according to an embodiment of the present disclosure. The network device 400 is a first network device. As shown in FIG. 4, the network device 400 includes a communication unit 410, configured to send first configuration information to a first terminal device, the first configuration information being configured to configure an SRS resource for CLI measurement, and timing of the SRS referring to timing of a first cell or referring to timing configured by the first network device, wherein the first cell is one of a serving cell with a frequency point associated with the SRS, a primary cell serving the first terminal device, and a primary secondary cell serving the first terminal device.

Optionally, the timing configured by the first network device is an SSB configured by a network side.

Optionally, the first configuration information includes timing offset information, and the timing offset information is configured to adjust the timing of the SRS.

Optionally, the first configuration information is associated with at least one of frequency information, BWP configuration information, cell identification information, and SRS index information.

Optionally, the first configuration information is associated with at least one of frequency information, BWP configuration information, cell identification information, SRS index information, and uplink configuration information.

Optionally, the network device 400 further includes a processing unit 420, the processing unit 420 is configured to determine that the first configuration information needs to be updated; and the communication unit 410 is further configured to send first indication information for the first configuration information to the first terminal device, the first indication information being configured to indicate the first terminal device to update part or all of content of the first configuration information.

Optionally, the first indication information is specifically configured to indicate the first terminal device to modify or delete part or all of the content of the first configuration information, or to increase the content of the first configuration information.

Optionally, the network device 400 further includes a processing unit 420, the communication unit 410 is further configured to receive second configuration information sent by a second network device, the second configuration information being configured to configure the SRS resource for the CLI measurement, wherein downlink reception of the first terminal device is interfered by uplink transmission of a second terminal device, and the second network device serves the second terminal device; and the processing unit 420 is configured to determine the first configuration information according to the second configuration information.

Optionally, the second configuration information is associated with at least one of frequency information, BWP configuration information, cell identification information, and SRS index information.

Optionally, the second configuration information is associated with at least one of frequency information, BWP configuration information, cell identification information, SRS index information, and uplink configuration information.

Optionally, the communication unit 410 is further configured to send first information to the second network device, the first information being configured to request the second network device to configure the SRS resource for the CLI measurement, wherein the first information includes at least one of frequency point information of a serving cell where the first terminal device is located, and bandwidth and frequency point information of dedicated BWP to the first terminal device.

Optionally, if the first information includes the bandwidth and frequency point information of the dedicated BWP to the first terminal device, the SRS resource configured by the second configuration information does not include resource that does not overlap with the dedicated BWP; or if the SRS resource configured by the second configuration information includes the resource that does not overlap with the dedicated BWP, the SRS resource configured by the first configuration information ignores the resource that does not overlap with the dedicated BWP.

Optionally, the network device 400 further includes a processing unit 420, the communication unit 410 is further configured to receive second indication information for the second configuration information sent by the second network device; and the processing unit 420 is configured to update part or all of content of the second configuration information according to the second indication information.

Optionally, the processing unit 42 is specifically configured to modify or delete part or all of the content of the second configuration information according to the second indication information, or increase the content of the second configuration information according to the second indication information.

Optionally, information between the first network device and the second network device is a terminal device-oriented Xn interface message, or the information between the first network device and the second network device is a non-terminal device-oriented Xn interface message.

Optionally, the network device 400 further includes a processing unit 420, the communication unit 410 is further configured to receive first information sent by the first terminal device, the first information including at least one of a maximum number of CLI measurement reports supported by the first terminal device, a maximum number of CLI measurement objects supported by the first terminal device, and a maximum number of SRS measurements supported by the first terminal device; and the processing unit 420 is configured to determine the first configuration information according to the first information.

Optionally, a number of CLI measurement reports configured in the first configuration information is less than or equal to a maximum number of CLI measurement reports supported by the first terminal device, and/or a number of CLI measurement objects configured in the first configuration information is less than or equal to a maximum number of CLI measurement objects supported by the first terminal device, and/or a number of SRS measurements configured in the first configuration information is less than or equal to a maximum number of SRS measurements supported by the first terminal device.

Optionally, at least one of the maximum number of the CLI measurement reports, the maximum number of the CLI measurement objects, and the maximum number of the SRS measurements is based on each terminal device, each cell, or each frequency.

Optionally, the communication unit 410 is further configured to send third configuration information to the first terminal device, the third configuration information including at least one of frequency information, BWP configuration information, cell identification information, SRS index information, and uplink configuration information.

Optionally, the uplink configuration information is frequency point information of the second network device, or the uplink configuration information is configuration information of an absolute frequency point corresponding to the second network device, wherein the uplink configuration information is configured to indicate a frequency point position of a lower boundary of a common RB 0.

Optionally, the communication unit 410 is further configured to receive first request information sent by the first terminal device, the first request information being configured to request configuration information for the CLI measurement, the communication unit 410 is specifically configured to send the first configuration information to the first terminal device in response to the first request information.

Optionally, the network device 400 is applied to an MR-DC scenario.

Optionally, the first network device is an MN device or an SN device in the MR-DC scenario.

Optionally, in the MR-DC scenario, the MN device and the SN device negotiate with each other to determine the first configuration information; or the MN device sends the first configuration information to the SN device.

Optionally, downlink reception of the first terminal device is interfered by uplink transmission of a second terminal device.

It shall be understood that the network device 400 according to the embodiment of the present disclosure may correspond to the network device in the method embodiment of the present disclosure, and the above and other operations and/or functions of respective units in the network device 400 are to respectively implement corresponding processes of the first network device in the method 200 shown in FIG. 2, and for the sake of brevity, details thereof are not repeated.

Figure 5:
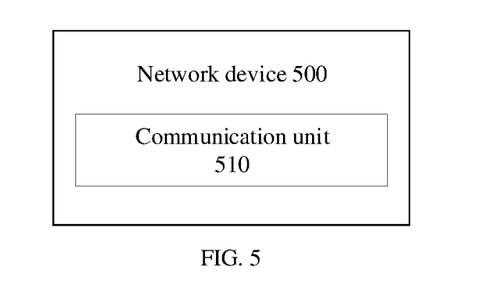
FIG. 5 is a schematic block diagram of another network device according to an embodiment of the present disclosure.

FIG. 5 shows a schematic block diagram of a network device 500 according to an embodiment of the present disclosure. The network device is a second network device. As shown in FIG. 5, the network device 500 includes a communication unit 510, configured to send second configuration information to a first network device, the second configuration information being configured to configure an SRS resource for CLI measurement, wherein downlink reception of a first terminal device is interfered by uplink transmission of a second terminal device, the first network device services the first terminal device, and the second network device services the second terminal device.

Optionally, the second configuration information is associated with at least one of frequency information, BWP configuration information, cell identification information, and SRS index information.

Optionally, the second configuration information is associated with at least one of frequency information, BWP configuration information, cell identification information, SRS index information, and uplink configuration information.

Optionally, the uplink configuration information is frequency point information of the second network device, or the uplink configuration information is configuration information of an absolute frequency point corresponding to the second network device, wherein the uplink configuration information is configured to indicate a frequency point position of a lower boundary of a common RB 0.

Optionally, the communication unit 510 is further configured to receive first information sent by the first network device, the first information being configured to request the second network device to configure the SRS resource for the CLI measurement, wherein the first information includes at least one of frequency point information of a serving cell where the first terminal device is located, and bandwidth and frequency point information of dedicated BWP to the first terminal device.

Optionally, the first information is received or obtained by the first network device from a third network device, wherein the first network device is an MN device in an MR-DC scenario, and the third network device is an SN device in the MR-DC scenario.

Optionally, if the first information includes the bandwidth and frequency point information of the dedicated BWP to the first terminal device, the SRS resource configured by the second configuration information does not include resource that does not overlap with the dedicated BWP.

Optionally, the network device 500 further includes a processing unit 520, the processing unit 520 is configured to determine that the second configuration information needs to be updated; and the communication unit 510 is further configured to send second indication information for the second configuration information to the first network device, the second indication information being configured to indicate the first network device to update part or all of content of the second configuration information.

Optionally, the second indication information is specifically configured to indicate the first network device to modify or delete part or all of the content of the second configuration information, or to increase the content of the second configuration information.

Optionally, the processing unit 520 is specifically configured to if the second network device receives request information sent by the first network device for requesting to update the second configuration information, determine that the second configuration information needs to be updated.

Optionally, the processing unit 520 is specifically configured to when a first timer expires, determine that the second configuration information needs to be updated.

Optionally, the processing unit 520 is further configured to starting the first timer after the second configuration information is sent.

Optionally, information between the first network device and the second network device is a terminal device-oriented Xn interface message, or the information between the first network device and the second network device is a non-terminal device-oriented Xn interface message.

It shall be understood that the network device 500 according to the embodiment of the present disclosure may correspond to the network device in the method embodiment of the present disclosure, and the above and other operations and/or functions of respective units in the network device 500 are to respectively implement corresponding processes of the second network device in the method 200 shown in FIG. 2, and for the sake of brevity, details thereof are not repeated.

Figure 6:
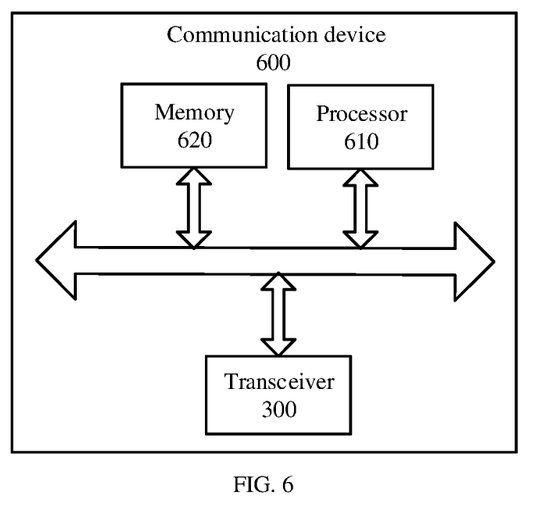
FIG. 6 is a schematic block diagram of a communication device according to an embodiment of the present disclosure.

FIG. 6 is a schematic structural diagram of a communication device 600 according to an embodiment of the present disclosure. The communication device 600 shown in FIG. 6 includes a processor 610, and the processor 610 may call and run a computer program from the memory to implement the method in the embodiment of the present disclosure.

Optionally, as shown in FIG. 6, the communication device 600 may further include a memory 620. The processor 610 may call and run a computer program from the memory 620 to implement the method in the embodiment of the present disclosure.

The memory 620 may be a separate device from the processor 610, or may be integrated in the processor 610.

Optionally, as shown in FIG. 6, the communication device 600 may further include a transceiver 630, and the processor 610 may control the transceiver 630 to communicate with other devices. Specifically, it may send information or data to other devices, or receive information or data sent by other devices.

The transceiver 630 may include a transmitter and a receiver. The transceiver 630 may further include an antenna, and the number of antennas may be one or more.

Optionally, the communication device 600 may specifically be the network device or base station in the embodiment of the present disclosure, and the communication device 600 may implement the corresponding processes implemented by the network device or base station in each method of the embodiment of the present disclosure. For the sake of brevity, details thereof are not repeated herein.

Optionally, the communication device 600 may specifically be the mobile terminal/terminal device in the embodiment of the present disclosure, and the communication device 600 may implement the corresponding processes implemented by the mobile terminal/terminal device in each method of the embodiment of the present disclosure. For the sake of brevity, details thereof are not repeated herein.

Figure 7:
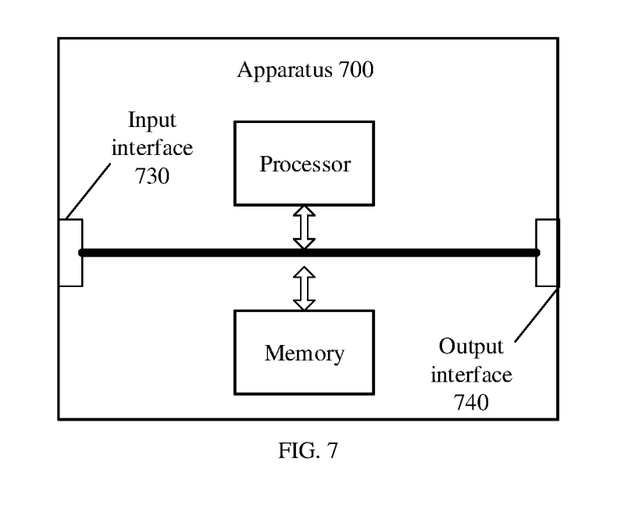
FIG. 7 is a schematic block diagram of an apparatus according to an embodiment of the present disclosure.

FIG. 7 is a schematic structural diagram of an apparatus according to an embodiment of the present disclosure. The apparatus 700 shown in FIG. 7 includes a processor 710, and the processor 710 may call and run a computer program from a memory to implement the method in the embodiment of the present disclosure.

Optionally, as shown in FIG. 7, the apparatus 700 may further include a memory 720. The processor 710 may call and run a computer program from the memory 720 to implement the method in the embodiment of the present disclosure.

The memory 720 may be a separate device from the processor 710, or may be integrated in the processor 710.

Optionally, the apparatus 700 may further include an input interface 730. The processor 710 may control the input interface 730 to communicate with other devices or chips, and specifically, may obtain information or data sent by other devices or chips.

Optionally, the apparatus 700 may further include an output interface 740. The processor 710 may control the output interface 740 to communicate with other devices or chips, and specifically, may output information or data to other devices or chips.

Optionally, the apparatus may be applied to the network device or base station in the embodiment of the present disclosure, and the apparatus may implement the corresponding processes implemented by the network device or base station in each method of the embodiment of the present disclosure. For the sake of brevity, details thereof are not repeated herein.

Optionally, the apparatus may be applied to the mobile terminal/terminal device in the embodiment of the present disclosure, and the apparatus may implement the corresponding processes implemented by the mobile terminal/terminal device in each method of the embodiment of the present disclosure. For the sake of brevity, details thereof are not repeated herein.

Optionally, the apparatus mentioned in the embodiment of the present disclosure may also be a chip. For example, it may be a system-level chip, a system chip, a chip system, or a system-on-chip.

Figure 8:
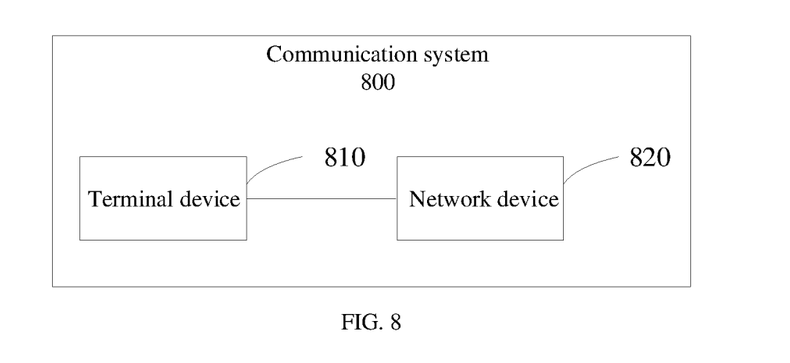
FIG. 8 is a schematic block diagram of a communication system according to an embodiment of the present disclosure.

FIG. 8 is a schematic block diagram of a communication system 800 according to an embodiment of the present disclosure. As shown in FIG. 8, the communication system 800 includes a terminal device 810 and a network device 820.

The terminal device 810 may implement corresponding functions implemented by the terminal device in the foregoing method, and the network device 820 may implement corresponding functions implemented by the network device in the foregoing method. For brevity, details thereof are not described herein again.

It shall be understood that, the processor of the embodiments of the present disclosure may be an integrated circuit chip, and have a signal processing capability. In implementation, the steps of the foregoing method embodiment may be implemented by using a hardware integrated logic circuit in the processor and/or implemented by using an instruction in a software form. The foregoing processor may be a general purpose processor, a digital signal processor (DSP), an application specific integrated circuit (ASIC), a field programmable gate array (FPGA) or another programmable logic device, a discrete gate or transistor logic device, or a discrete hardware component. The respective methods, steps or logic blocks disclosed in the embodiments of the present disclosure may be achieved or executed. The general purpose processor may be a microprocessor, or may be any conventional processor, or the like. Steps of the methods disclosed with reference to the embodiments of the present disclosure may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing method in combination with hardware of the processor.

It shall be understood that, the memory in the embodiments of the present disclosure may be a volatile memory or a non-volatile memory, or may include both the volatile memory and non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), and is used as an external cache. By way of examples but of no limitation, many forms of RAM are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synclink dynamic random access memory (SLDRAM), and a direct rambus random access memory (DR RAM). It shall be noted that, the memory of the system and the method described herein is intended to include but not be limited to these memories and any other suitable type of memory.

It shall be understood that, the above memory is an example but is not intended for limitation. For example, the memory in the embodiments of the present disclosure may alternatively be a static RAM (SRAM), a dynamic RAM (DRAM), a synchronous DRAM (SDRAM), a double data rate SDRAM (DDR SDRAM), an enhanced SDRAM (ES- DRAM), a synch link DRAM (SLDRAM), a direct rambus RAM (DR RAM), and the like. That is, the memory described in the embodiments of the present disclosure is intended to include but not be limited to these memories and any other suitable type of memory.

An embodiment of the present disclosure further provides a computer readable storage medium. The computer readable storage medium is configured to store a computer program.

Optionally, the computer readable storage medium may be applied to the network device or base station in the embodiment of the present disclosure, and the computer program enables a computer to execute a corresponding process implemented by the network device or base station in each method of the embodiment of the present disclosure. For brevity, details thereof are not described herein again.

Optionally, the computer readable storage medium may be applied to the mobile terminal/terminal device in the embodiment of the present disclosure, and the computer program enables a computer to execute a corresponding process implemented by the mobile terminal/terminal device in each method of the embodiment of the present disclosure. For brevity, details thereof are not described herein again.

An embodiment of the present disclosure further provides a computer program product. The computer program product includes a computer program instruction.

Optionally, the computer program product may be applied to the network device or base station in the embodiment of the present disclosure, and the computer program instruction enables a computer to execute a corresponding process implemented by the network device or base station in each method of the embodiment of the present disclosure. For brevity, details thereof are not described herein again.

Optionally, the computer program product may be applied to the mobile terminal/terminal device in the embodiment of the present disclosure, and the computer program instruction enables a computer to execute a corresponding process implemented by the mobile terminal/terminal device in each method of the embodiment of the present disclosure. For brevity, details thereof are not described herein again.

An embodiment of the present disclosure further provides a computer program.

Optionally, the computer program may be applied to the network device or base station in the embodiment of the present disclosure, and the computer program, when running on a computer, enables the computer to execute a corresponding process implemented by the network device or base station in each method of the embodiment of the present disclosure. For brevity, details thereof are not described herein again.

Optionally, the computer program may be applied to the mobile terminal/terminal device in the embodiment of the present disclosure, and the computer program, when running on a computer, enables the computer to execute a corresponding process implemented by the mobile terminal/terminal device in each method of the embodiment of the present disclosure. For brevity, details thereof are not described herein again.

A person of ordinary skill in the art may be aware that, units and algorithm steps described in combination with examples of the embodiments disclosed herein may be implemented by using electronic hardware or a combination of computer software and electronic hardware. Whether these functions are executed by means of hardware or software depends on specific applications and design constraints of the technical solutions. A person skilled in the art may use different methods to implement the described functions for each particular application, which should not be considered that the implementation goes beyond the scope of the present disclosure.

A person skilled in the art may clearly understand that, for simple and clear description, specific working processes of the foregoing described system, device, and unit may refer to corresponding process in the foregoing method embodiments, and details thereof are not described herein again.

In the several embodiments provided in the present disclosure, it shall be understood that the disclosed system, device, and method may be implemented in other manners. For example, the device embodiments described above are merely examples. For example, the unit division is merely logical function division, and there may be other division manners in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the devices or units may be implemented in electrical, mechanical, or other forms.

The units described as separate parts may or may not be physically separate, and the parts displayed as units may or may not be physical units, may be located in one position, or may be distributed on multiple network units. Some of or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

Described above are merely specific implementations of the present disclosure, but the protection scope of the present disclosure is not limited thereto. Changes or replacements readily figured out by any person skilled in the art within the technical scope disclosed in the present disclosure shall be covered by the protection scope of the present disclosure. Therefore, the protection scope of the present disclosure shall be subject to the protection scope of the claims.

What is claimed is:

1. A wireless communication method, wherein the method comprises:
sending, by a first network device, first configuration information to a first terminal device, the first configuration information being configured to configure a sounding reference signal (SRS) resource for cross link interference (CLI) measurement; and receiving, by the first network device, first information sent by the first terminal device, the first information comprising a maximum number of SRS measurements supported by the first terminal device.

2. The method according to claim 1, wherein the first configuration information is associated with at least one of: frequency information, bandwidth part (BWP) configuration information, cell identification information, and SRS index information.

3. The method according to claim 1, wherein the method further comprises:
determining, by the first network device, that the first configuration information needs to be updated; and
sending, by the first network device, first indication information for the first configuration information to the first terminal device, the first indication information being configured to indicate the first terminal device to update part or all of content of the first configuration information.

4. The method according to claim 3, wherein the first indication information is specifically configured to indicate the first terminal device to modify or delete part or all of the content of the first configuration information, or to increase the content of the first configuration information.

5. The method according to claim 1, wherein the first information further comprising at least one of:
a maximum number of CLI measurement reports supported by the first terminal device, and a maximum number of CLI measurement objects supported by the first terminal device.

6. The method according to claim 5, wherein:
a number of CLI measurement reports configured in the first configuration information is less than or equal to the maximum number of CLI measurement reports supported by the first terminal device;
a number of CLI measurement objects configured in the first configuration information is less than or equal to the maximum number of CLI measurement objects supported by the first terminal device; or
a number of SRS measurements configured in the first configuration information is less than or equal to the maximum number of SRS measurements supported by the first terminal device.

7. The method according to claim 5, wherein at least one of the maximum number of the CLI measurement reports, the maximum number of the CLI measurement objects, and the maximum number of the SRS measurements supported by the first terminal device is pre-configured, or is determined based on capability of the first terminal device.

8. The method according to claim 5, wherein at least one of the maximum number of the CLI measurement reports, the maximum number of the CLI measurement objects, and the maximum number of the SRS measurements is based on a terminal device, a cell, or a frequency.

9. The method according to claim 1, wherein the method is applied to a multi radio access technology dual connectivity (MR-DC) scenario.

10. The method according to claim 9, wherein the first network device is a master node (MN) device or a slave node (SN) device in the MR-DC scenario.

11. The method according to claim 10, wherein in the MR-DC scenario,
the MN device and the SN device negotiates with each other to determine the first configuration information; or
the MN device sends the first configuration information to the SN device.

12. The method according to claim 1, wherein timing of the SRS refers to timing of a first cell or refers to timing configured by the first network device,
wherein the first cell is one of:
a serving cell with a frequency point associated with the SRS, a primary cell serving the first terminal device, and a primary secondary cell serving the first terminal device.

13. A network device, which is a first network device, wherein the network device comprises:
a processor; and
a memory, configured to store a computer program that, when being executed by the processor, causes the processor to implement a wireless communication method, wherein the method comprises:
sending, by the first network device, first configuration information to a first terminal device, the first configuration information being configured to configure a sounding reference signal (SRS) resource for cross link interference (CLI) measurement; and
receiving, by the first network device, first information sent by the first terminal device, the first information comprising a maximum number of SRS measurements supported by the first terminal device.

14. The network device according to claim 13, wherein the first configuration information is associated with at least one of:
frequency information, bandwidth part (BWP) configuration information, cell identification information, and SRS index information.

15. The network device according to claim 13, wherein the method further comprises:
determining, by the first network device, that the first configuration information needs to be updated; and
sending, by the first network device, first indication information for the first configuration information to the first terminal device, the first indication information being configured to indicate the first terminal device to update part or all of content of the first configuration information.

16. The network device according to claim 15, wherein the first indication information is specifically configured to indicate the first terminal device to modify or delete part or all of the content of the first configuration information, or to increase the content of the first configuration information.

17. The network device according to claim 13, wherein the first information further comprising at least one of:
a maximum number of CLI measurement reports supported by the first terminal device, and a maximum number of CLI measurement objects supported by the first terminal device.

18. The network device according to claim 17, wherein:
a number of CLI measurement reports configured in the first configuration information is less than or equal to the maximum number of CLI measurement reports supported by the first terminal device;
a number of CLI measurement objects configured in the first configuration information is less than or equal to the maximum number of CLI measurement objects supported by the first terminal device; or
a number of SRS measurements configured in the first configuration information is less than or equal to the maximum number of SRS measurements supported by the first terminal device.

19. The network device according to claim 17, wherein at least one of the maximum number of the CLI measurement reports, the maximum number of the CLI measurement objects, and the maximum number of the SRS measurements supported by the first terminal device is pre-configured, or is determined based on capability of the first terminal device.

20. The network device according to claim 17, wherein at least one of the maximum number of the CLI measurement reports, the maximum number of the CLI measurement objects, and the maximum number of the SRS measurements is based on a terminal device, a cell, or a frequency.

\* \* \* \* \*